INVENTOR
GIUSEPPE ALFIERI

Fig. 10

INVENTOR
GIUSEPPE ALFIERI

United States Patent Office 3,058,364
Patented Oct. 16, 1962

3,058,364
PRESELECTIVE ELECTRO-PNEUMATIC APPARATUS FOR CONTROLLING GEAR CHANGES
Giuseppe Alfieri, Milan, Italy, assignor to Fabbrica Italiana Magneti Marelli S.p.A., Milan, Italy, a company of Italy
Filed May 7, 1958, Ser. No. 733,537
Claims priority, application Italy May 8, 1957
6 Claims. (Cl. 74—334)

The present invention relates to preselective electro-pneumatic equipment for the control of a gear change mechanism, and of the type comprising essentially a preselector, a set of electrovalves, a set of operating cylinders fed by a convenient source of compressed fluid and an electric control device associated with a friction clutch. Installations of this kind are widely used and form the subject matter of my Italian Patents Nos. 531,997; 542,226; and 553,571.

It is an object of the present invention to provide new preselective electro-penumatic apparatus wherein the operations of selection, of engaging and of disengaging in a gear change mechanism take place through a pneumatic servo-control the essential characteristic of which is that it has a group of operating cylinders which follows the operations of a standard gear change mechanism controlled mechanically by hand.

The advantages of the present invention are substantial. First, it is easy to apply the servocontrol of the invention to standard gear change devices of purely mechanical type and, moreover, it is possible to provide for the production of vehicles of two kinds without varying the mechanical gear change system.

Moreover, the equipment according to the invention is characterized by a reduced number of electrovalves for carrying out all the necessary operations whence it affords a very high degree of effectiveness with a minimum of apparatus.

The invention will now be illustrated with reference to the accompanying drawings wherein:

FIG. 3 is a perspective view of a portion of the embodiment partially cut away;

FIG. 9 is a bottom plan view of the electro distributors and the operating cylinders according to the invention;

With reference to the drawing, with $a$ is indicated a control rod provided with three notches T$s$, with $b$ a member rigid with the rod $a$ and provided with three fixed extensions 61, 62, and 63. Engaging members 65, 66 and 67 are respectively fixed to rods, axes S1, S2 and S3, which extend perpendicularly to the control rod $a$.

The rod $a$ can undergo translation along its own axis in opposite directions as indicated by the arrows V1 and V2 and also rotation about its own axis as indicated by the arrows $r$1 and $r$2.

According to the invention, the translation in the sense of arrows V1 or V2 constitutes the speed cylinder $m$. ation and is controlled by a double-acting cylinder $m$. The rotation in the sense of arrows $r$1 or $r$2 constitutes the operation of engaging of the preselected speed elements and is controlled by a stepped cylinder $n$. At one end of the rod $a$, there is a spring W having the function of selecting automatically the third speed and the fourth speed. At the other end of the rod, there is fixed at O the arm $g$ at the extension whereon there is accommodated a brush $q$ which is able to shift during the axial movement of the rod $a$ on the contacts $p$1, $p$2 and $p$3. At the bottom of arm $g$ is an extension or fulcrum $f$ supported in the cylinder $n$ such that said arm $g$ can rotate about O, as well as shift in the direction of arrows $i$. During the rotation around O, the brush $q$ does not detach from the contacts $p$1 and $p$3. Thus, as illustrated in my Italian patent specification No. 553,571, the operation of engaging a speed or of passing from one speed to the other, takes place in three stages: zero-setting, selection, engagement.

Figures 1, 2:
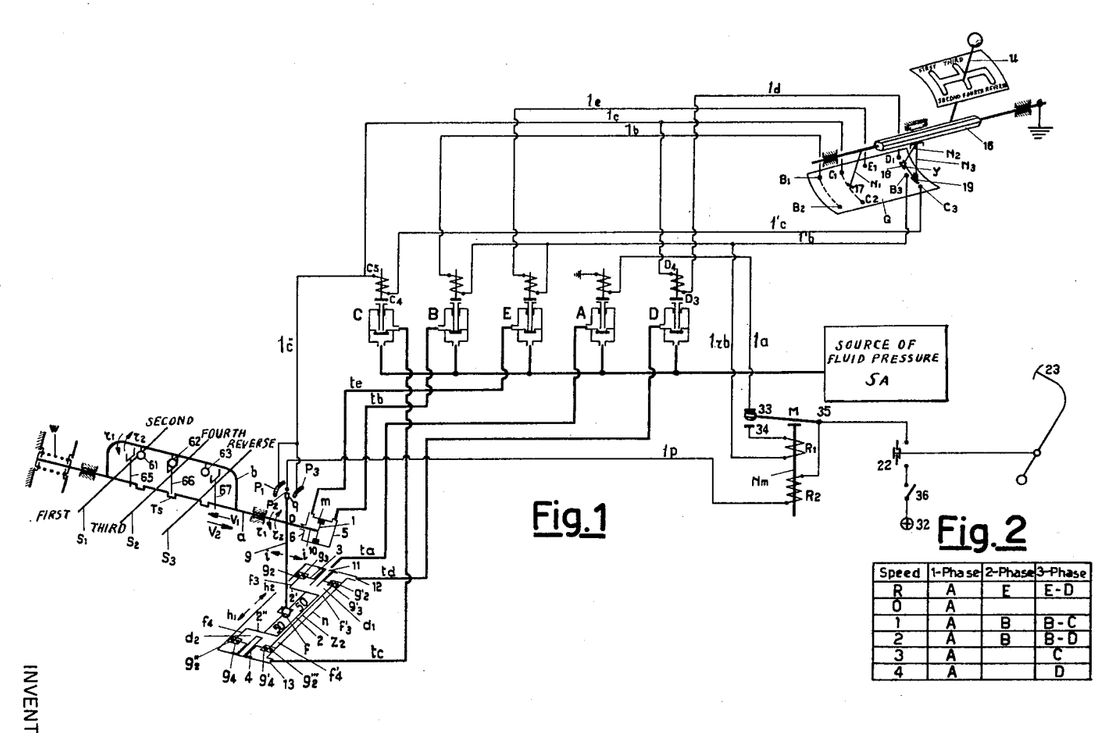
FIG. 1 is a diagrammatic illustration of an embodiment according to the invention providing four forward speeds and a reverse speed.
FIG. 2 is a tabular summary of the sequence of operations corresponding to each speed.
Figure 2:
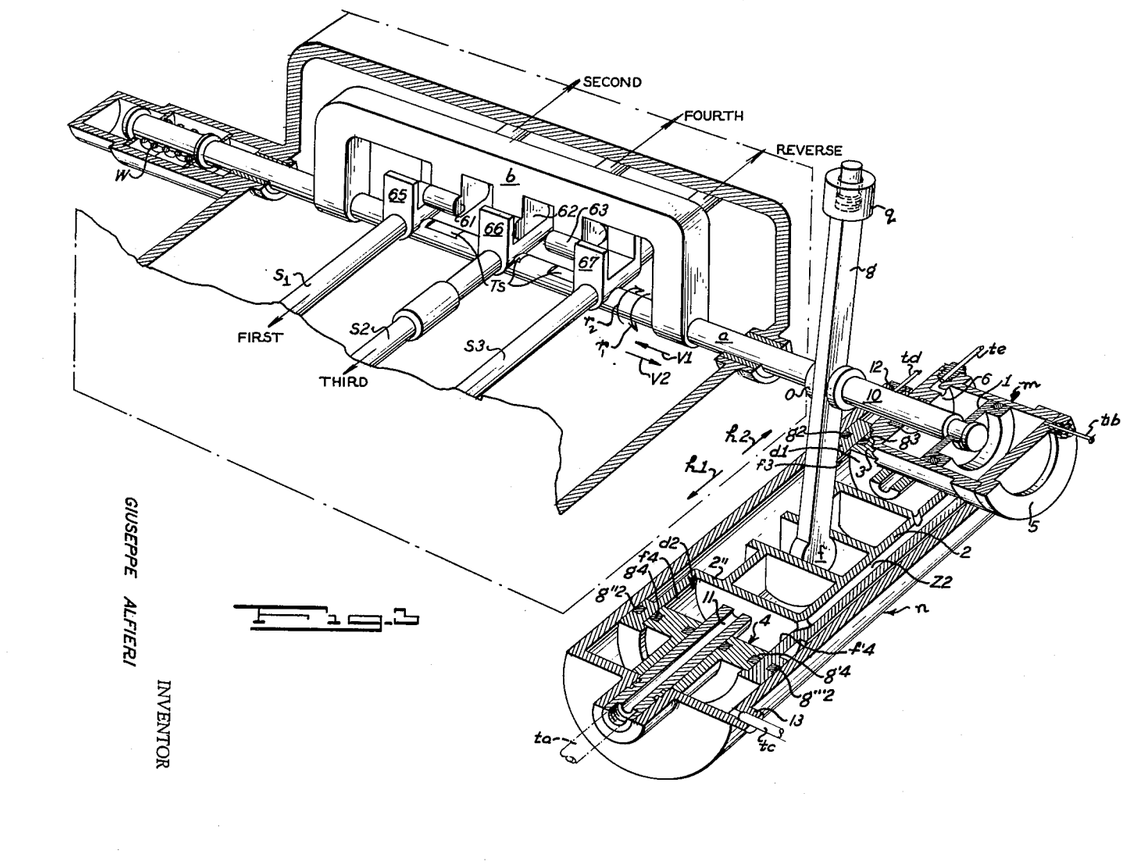
Figure 4:
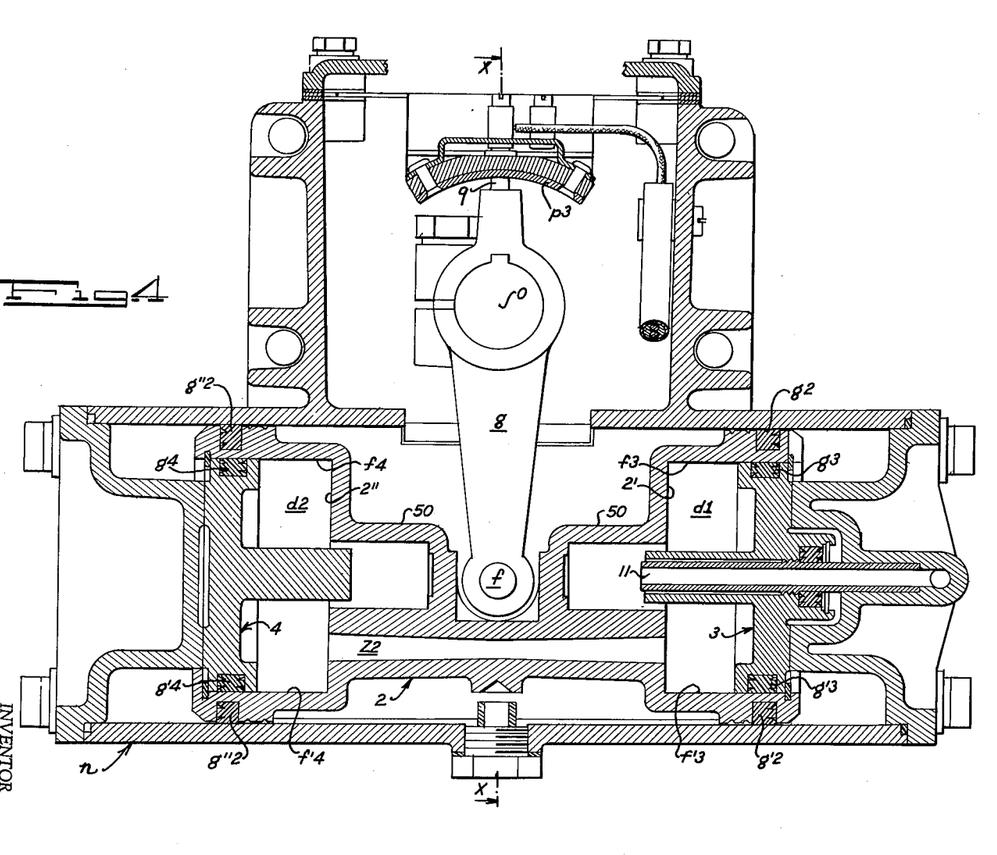
FIG. 4 is a sectional view of a portion of the embodiment represented in FIG. 3.
Figure 5:
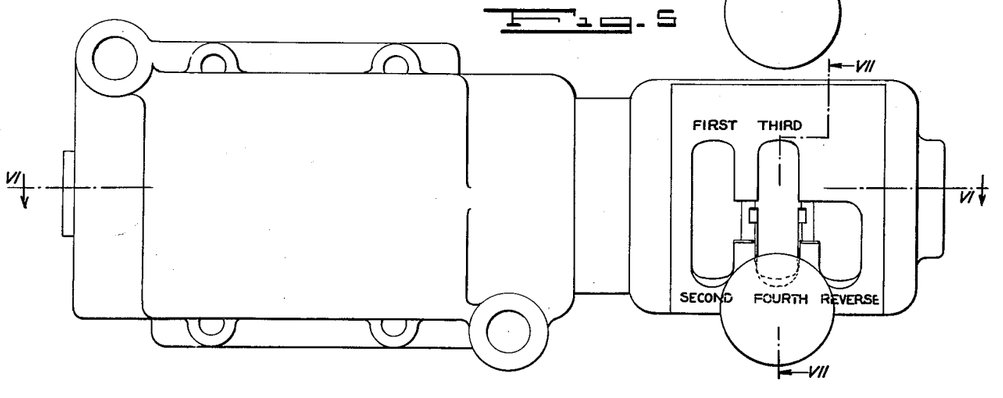
FIG. 5 shows a plan view of the preselector.
Figure 6:
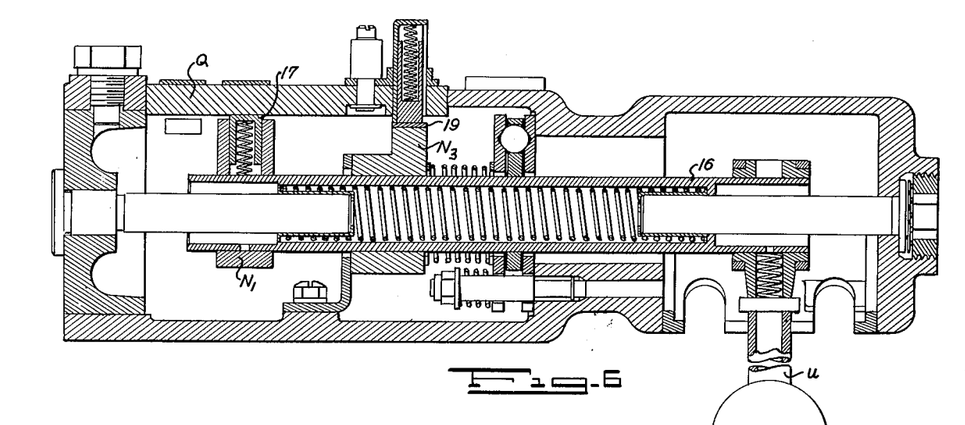
FIG. 6 is a sectional view taken along the line VI—VI in FIG. 5.
Figure 7:
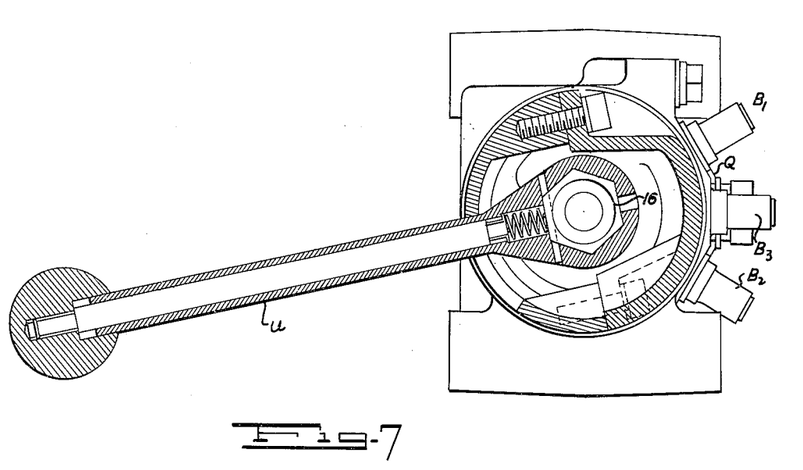
FIG. 7 is a sectional view taken along the line VII—VII in FIG. 5.
Figure 8:
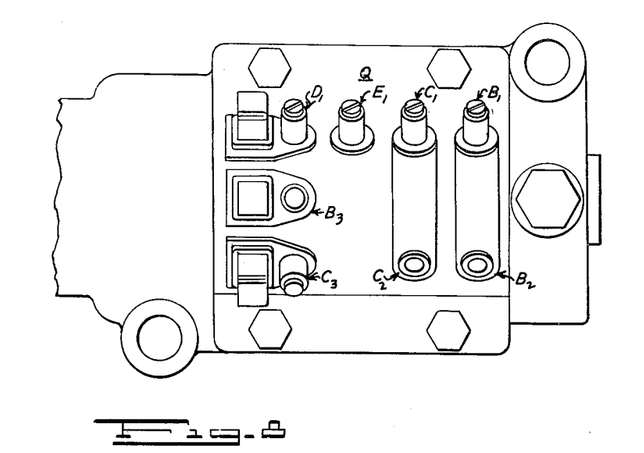
FIG. 8 is a view of the preselector of FIG. 5 showing the contacts thereon.
Figure 10:
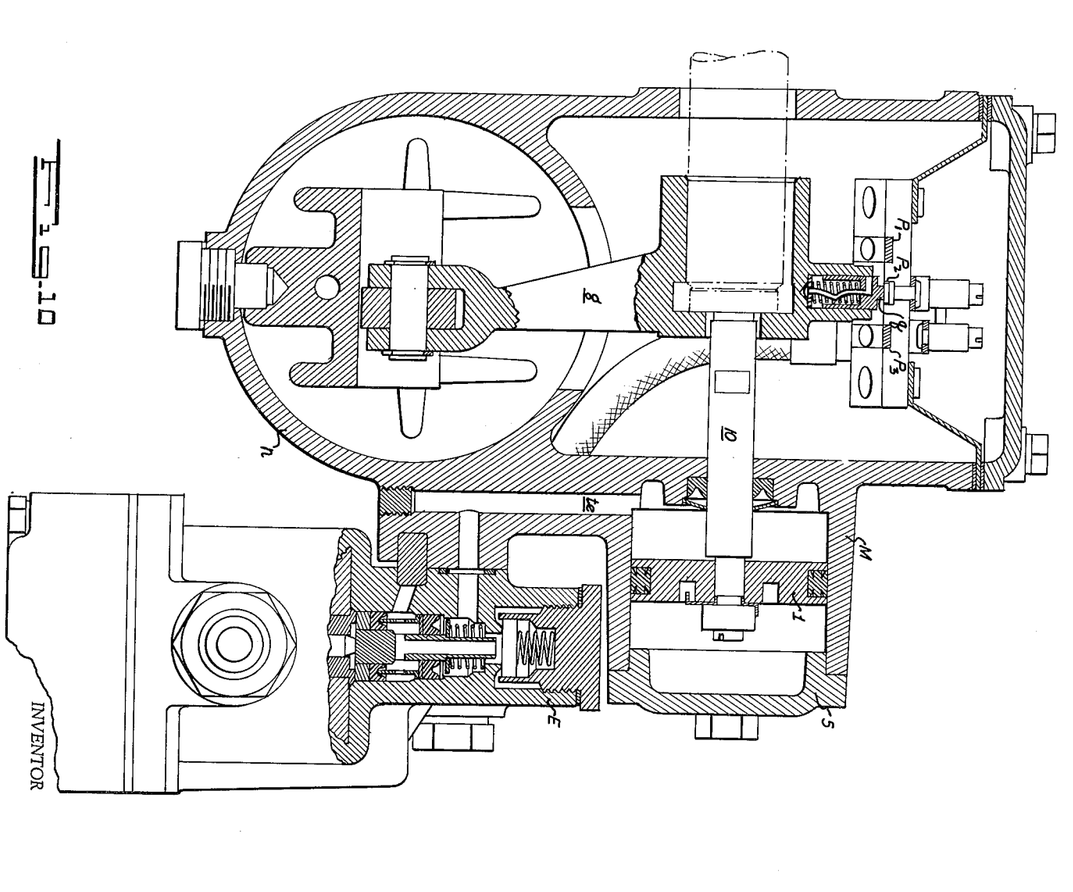
FIG. 10 is a view partially in section along the line X—X in FIG. 4.
Figure 11:
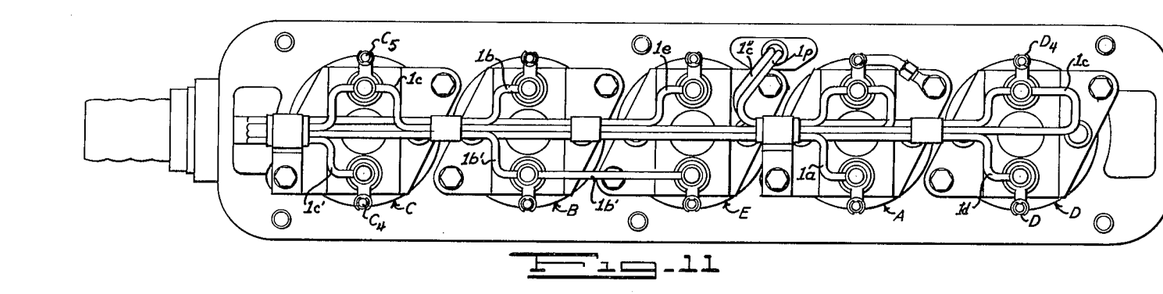
FIG. 11 is a top plan view of the electro distributors.
Figure 12:
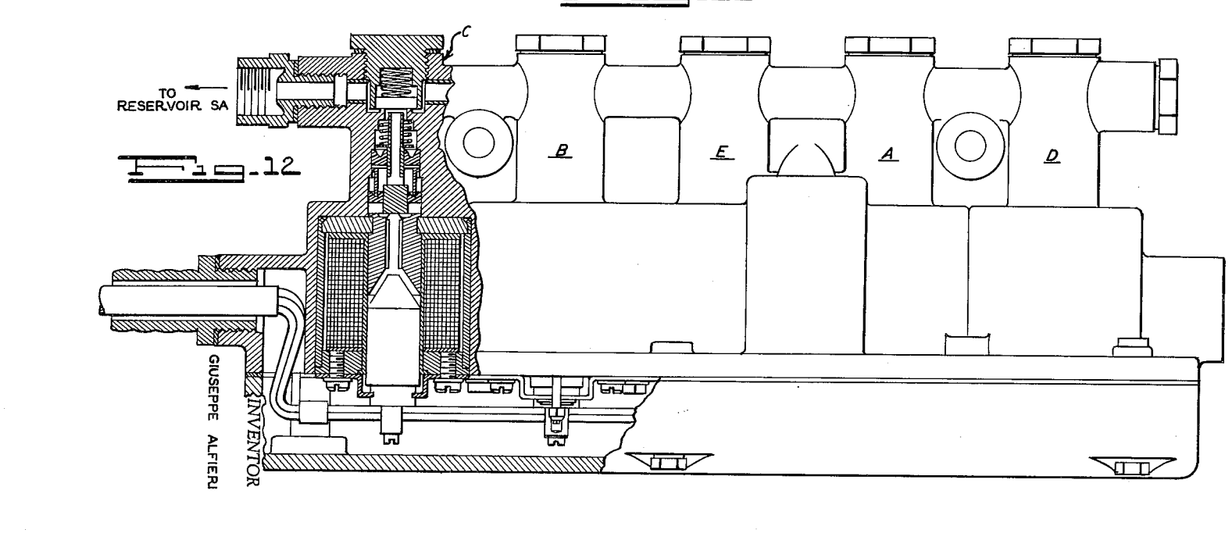
FIG. 12 is an elevation view of the electro distributors of FIG. 11 showing one of the electro distributors in section.

The operations of changing the speed are carried out in the following manner:

(1) Zero-setting and disengagement of the speed by means of rotation of the rod $a$ to its idle position (as illustrated in FIGS. 1 and 3).

(2) Selection of the speed to be engaged by means of axial displacement of the rod $a$. The third and fourth speeds are automatically selected by the spring W.

(3) Engagement of the desired speed by means of rotation of the rod $a$.

The selecting operation is obtained in accordance with the axial displacement of the rod $a$ as controlled directly by the double-acting cylinder $m$ through the piston rod 10 of the piston 1. The operation of engaging of the speeds is due to the rotation of the rod $a$ as caused through arm $g$ by the displacement of the pistons of the cylinder $n$ in the direction $h$1 or $h$2. One of the fixed extensions (61, 62 or 63) on member $b$ engages one of the engagement members (65, 66 or 67) and during said rotation of $a$, displaces the engagement member and the corresponding rod (S1, S2 or S3) to select the speed gear to be engaged.

Inside the double-acting cylinder $m$, there is accommodated a piston 1 coupled to a piston rod 10 which is rigidly connected with rod $a$. Said piston is displaced against an end plate 5 or 6 according to whether fluid arrives through the conduit $te$ or $tb$, from the electro-distributors E or B, i.e., according to which face of the piston the fluid pressure acts on.

The stepped cylinder $n$ comprises a piston 2 equipped with gaskets $g$2, $g'$2, $g''$2, $g'''$2, and has a lateral conduit Z2 to allow the compressed air coming from A via $ta$ to flow simultaneously into the chambers $d$1 and $d$2. In that way the feeding of the stepped cylinder $n$ from the valve A will serve to either maintain the fulcrum $f$ in a neutral or idle position, or cause it to return thereto as will be explained more fully hereinafter.

The pistons 3 and 4 in the cylinder $n$ are identical to each other and they are symmetrically arranged with respect to the transverse axis of cylinder $n$. The piston 3 slides with its sealing gaskets $g$3 and $g'$3 on the internal faces $f$3 and $f'$3 of $d$1 and is passed through at its central portion by the conduit 11 fed by the piping $ta$. The piston 4 slides with its gaskets $g$4 and $g'$4 on the internal faces $f$4 and $f'$4 of $d$2. As noted above, if the stepped cylinder $n$ is fed only by the fluid coming from A through $ta$, the compressed air flows from $d$1 through the channel z2 and into the chamber d2 whence the whole piston 2 comprising the faces f3 and f'3 and f4 and f'4 and the piston rod 50, assumes the central position shown in the drawing, under the action of the equal and opposite pressures exerted by the fluid. If instead, the fluid comes from the electro-distributor D, through td and 12 (see FIG. 1), the piston 3 shifts in the direction of h1 while sliding over the inner faces of f3 and f'3 until arriving at the bottom 2' and moving the piston 2, in the same direction. As a consequence, the fulcrum f follows this displacement with consequent rotation of the arm g according to the arrow r2. Similarly, if the compressed fluid comes from the electrovalve C through tc and 13, the piston 4 moves against 2" to act upon piston 2 which will be displaced in the direction of arrow h2 while displacing f, thereby causing the rotation of arm g in the direction indicated by r1.

The equipment for the control of the gear change servocontrol according to the invention comprises essentially a preselector constituted by the lever U which acts upon the rod 16 at the end of which there is fixed the arm N1 which can slide and rotate with the lever U so as to place its own mobile contact 17 on the fixed contacts B1, B2, C1, C2, E1, when the said lever U is in the positions of first, second, third and fourth speeds and reverse gear. The other two arms N2 and N3 which are terminated with the mobile contacts 18 and 19, respectively, are engaged with respect to the rod 16 such that the two arms N2 and N3 can only rotate but not slide. Said arms are rigidly connected together so that contacts 18 and 19 are able to contact together respectively the contacts D1 and B3; and B3 and C3. In particular, in idling position the ends 18 and 19 of N2 and N3 occupy the position shown in the drawing and do not touch any contact; when the lever U is moved to a position corresponding to first or third speeds, 18 and 19 connect the contacts B3—C3 while if the lever U is in second or fourth speeds or in reverse gear, 18 and 19 connect the terminals D1 and B3. The electric contacts associated with the board Q of the preselector are connected through the lines 1b, 1c, 1e, 1d, 1'b, 1'c and 1a to the electric circuits of five electrodistributors B, C, E, D, A which convey, if energized, the compressed air coming from the source SA into the two cylinders m and n; more particularly, the electrodistributors B and E are in communication through the conduits tb and te respectively with the two chambers of the double-acting cylinder m while the electrodistributors D, A, C are in communication through the conduits td, ta and tc with the three conduits 12, 11, 13 of the stepped cylinder n.

The electric device associated with the pedal of the friction clutch is constituted by a contact 22 movable with the pedal 23, a supply battery 32 of which only the + is shown, and a contact M movable between the ends 33 and 34 respectively of the line terminating at the electrovalve A and at the free terminal of the coil R1 connected to the line 1rb and 1'b.

On the same magnetic core Nm of R1 there is mounted a second relay R2 the coil of which is connected at one side to the contact p2 through the line 1p and, on the other side, to the end 35 of the mobile contact M.

The circuit breaker 36 serves to cut off the battery 32.

Operation of the equipment is as follows:

The position of the members as shown in the drawing is that corresponding to idling. In fact on the preselector the control lever U is not inserted in any of the grooves corresponding to the speeds and the ends 17, 18 and 19 of the arms N1, N2 and N3 do not touch any of the contacts (B1—B2, C1—C2, E1, D1, B3) arranged on the board Q. The device associated with the pedal of the clutch 23 provides for the movable contact M to be on terminal 33 of the line 1a terminating at the coil of valve A, the other terminal of which is grounded. That means that if 36 is closed and switch 22 is closed, the battery 32 will feed the electrovalve A which will make compressed air flow from the source SA into the cylinder n thereby insuring that the piston 2 is in the central position. It is evident that if the piston 2 was previously displaced (clutch engaged) toward the right or toward the left, in the so-called zero-setting stage, it would be returned to its central position.

When the lever U is moved to the first speed position, the contact 17 of N1 is placed on the contact B2 (since N1 slides and rotates with rod 16) while the contacts 18 and 19 of N2 and N3, rigid with each other but prevented from sliding, will contact B3 and C3. Depressing the pedal 23 of the friction clutch energizes A for zero-setting and moreover the contact 22 connects the battery to the relay R2 the coil of which has a terminal connected to 35 and the other terminal connected to the line 1p is connected to ground through the fixed contact p2 and the brush q. Then current flows in R2 which being energized attracts the contact M to contact 34 so as to apply the voltage of the battery 32 through 35—M—34—R1—1rb—1'b to a terminal of the coils of the electrovalves E, B and C. But of these, only the coil of B has its second terminal connected to ground through 17 which contacts B2 (connected electrically with B1) of the line 1b. The electrovalve B is then activated: the fluid passes from the source SA through B into tb and then arrives at the double-acting cylinder m and pushes the piston 1 onto the end plate 6 and, consequently, displaces the rod a in the direction of the arrow V1 to compress the spring W. Accordingly, when the valve B is activated, the second stage of selection has been accomplished. The third stage of engagement proper is accomplished automatically. In fact, when the piston of m reaches the end plate 6 thereby displacing the rod a in the direction indicated by V1, the brush q will be displaced from contact p2 to engage contact p1. When brush q contacts p1, the terminal C5 of the coil of C is connected to ground, which has its second terminal C4 connected through the line 1'c to the contact C3 of the board Q whereon contact 19 is engaged. Contact 19 receives through the small bridge Y the voltage of the battery 32, 18 being connected thereto through B3, 1'b, 1rb, R1, M, 35. Thus, the coil of the electrodistributor C is energized as soon as brush q touches p1. The energizing of the coil C4—C5 activates the valve C, and air flows from SA through tc and the conduit 13 into the piston 4 of the cylinder n which shifts the fulcrum f in the direction of h2 to cause the arm g, the rod a and the member b to rotate in the direction of r1. Since the piston 1 has engaged the end plate 6 and the rod a has shifted in the direction of V1, the extension 62 has disengaged from engaging member 66 and extension 61 has been engaged in engaging member 65 so that only the rod S1 will be displaced due to the rotation of the member b in the direction of r1. By virtue of the rotation of member b in the direction r1, rod S1 causes engagement of the gears in the transmission corresponding to the first speed. Hence, for the engagement of gears in the transmission corresponding to the first speed, the coils of the electrovalves B and C7 are energized while in the selection only B is activated. It should be noted that with the passage of brush q on p1, the circuit of the relay of R2 is opened. However it will be the other coil R1 that keeps M on 34 for the entire time during which the pedal 23 of the friction clutch remains depressed. On release of 23, 22 opens and de-energizes R1, B and C. Since the operation of depressing the friction clutch employs a minimum time, it can be said that through C4—C5—P1 there passes a short current pulse that ceases on the ceasing of the action upon 23. At that time however the first speed is engaged and the relays are all de-energized with consequent de-activation of the electro-valves and discharge from the cylinders.

The contact M again contacts 33 so as to prepare the circuits for the subsequent stage of zero-setting.

In passing from the first speed to the second, the hand lever U will pass into the second notch and the contacts 18 and 19 will engage respectively contacts D1 and B3 while the contact 17 of N1 will engage contact B1. As soon as pedal 23 is depressed and the contact 22 is closed, M being on 33, the valve A or zero-setting valve will start operation at once. Compressed air flows from A to return the fulcrum f of the cylinder n to the center thereof. The brush q is again on p2. Hence lever M will pass onto contact 34 and the line 1rb will thus receive voltage from the battery to apply it through 1'b to the coil of B which is grounded since 17 is on B1.

Hence the valve B is opened: the compressed air flows into m through tb to displace the piston 1 onto the end plate 6 whereby the rod a will be maintained displaced in the direction of V1 and the extension 61 will remain engaged in 65. The second selecting stage is accomplished.

The voltage of the battery is coupled to B3 through 1rb and 1'b and from B3 to D1 through y and from D1 to the terminal D3 of the coil of D which has a second terminal D4 connected to ground because it is connected through 1c and b"c to the contact p1—q. Consequently, the electrodistributor D is activated and air enters n, through td and 12; the piston 3 therefore will slide over the inner faces f3 and f'3 to bottom 2' and displace the piston 2 in the direction of the arrow h1. The fulcrum f in shifting will rotate the arm g and therewith the rod a and the member b in the direction r2 thereby causing rod S1 to engage the gears in the transmission corresponding to the second speed. In the tabulation of FIG. 2, it is seen that for the second speed the selection is made by the valve B while the engagement proper is effected by the valves D—B.

For the third (and fourth) speed the third (and fourth) stage develops in an analogous manner but the selection will be made and maintained no longer by an electrovalve but by the spring W. In fact, when the lever U is taken into the groove corresponding to the third speed 17 contacts C2, 19 contacts C3 and 18 contacts B3; as soon as zero-setting has taken place, that is, as soon as brush q has contacted p2, R2 energizes and attracts M onto 34. The line 1rb receives voltage and transmits it to 1'b, then to B3, to 18, to y, to 19 and to C3, and from there to the line 1'c which then applies the voltage to the terminal C4 of the coil of C connected with the other terminal C5 through the line 1c, to C2 which is connected to ground. Accordingly, the electrovalve C is activated.

The activation of the single valve C only, will cause flow of air to the cylinder of 4 in n through tc and 13. The fulcrum f will then be shifted in the direction of h2 and the member b will be rotated in the direction of r1. But since with the displacement imparted by W to the rod a the extension 62 has penetrated into the engaging member 66, only the rod S2 will be rotated by the member b in the direction r1 to engage the gears in the transmission corresponding to the third speed.

For the engagement of the fourth speed, it is clearly seen that when U is moved to the fourth speed position, 17 contacts C1, 18 contacts D1 and 19 contacts B3. As soon as the pedal 23 of the friction clutch 23 is depressed, the zero-setting is achieved, M returns to 34, the line 1rb applies voltage to the line 1'b and, through B3—19—y—18—D1—1d—D3—D4—1c—C1—17 ground-connection of N1, to the coil of the electrovalve D which is the only one having a closed circuit.

The compressed air flows from the source of pressure medium SA into the stepped cylinder n from td and 12 and displaces in the direction of h1 the piston 3, and fulcrum f whereby the rod a and the member b will be rotated in the direction of r2 to cause displacement of the rod S2 which is the only one engaged due to the position imposed on the rod a by the spring W.

For reverse gear, the operations are as in the case of first and second speeds: it will be easy indeed to see that for U in the reverse notch of the indicator, 17 contacts E1 while 18 and 19 will remain respectively on D1 and B3. Selection will then be effected by the electrodistributor E which will displace the piston 1 onto the end plate 5 of m while moving the extension 63 to engage with engaging member 67 and the brush q against contact p3 of the line 1"c. As with the configuration for fourth speed, the position of 18 on D1 and of D19 on B3 is not varied, and the electro-valve D will displace the piston 3 to shift in the direction h1 and the member b to rotate in the direction of r2 whence S3, the only rod engaged, will cause engagement of the reverse gear in the transmission.

From the foregoing it appears clearly that the arm g associated with the stepped cylinder n repeats accurately the movements of the lever of a standard gear change controlled by hand; as a consequence, the servocontrol according to the invention will be applicable to any gear change without requiring any modifications. Moreover, it should be noted that the equipment hereinbefore described affords the further advantage of a considerable reduction of electrovalves with respect to conventional equipment and provides nevertheless a special sequence, due to the adoption of the spring W which effects the selecting stages for the third and fourth speeds.

A further simplification and reduction of apparatus is also obtained with the device associated with the pedal of the friction clutch and the preselector.

It is evident that the present invention is susceptible of many variants within the skill of those skilled in the art; hence those variants do not depart from the scope of the invention.

What is claimed is:

1. Gear selection apparatus comprising a source of a pressure medium; an electro-valve coupled to said source; gear engaging means including a cylinder, pistons spaced in said cylinder and displaceable means between said pistons and selectively engageable by said pistons with the latter displaced to perform a gear engaging function; said electro-valve being connected to said cylinder between said pistons for urging the latter apart whereby said displaceable means assumes a neutral position, a clutch pedal, and swicth means actuated by said pedal, an electric circuit coupling said electrovalve to a source of electromotive force, said switch means being in said circuit for selectively actuating said electro-valve to connect said source to said cylinder and urge said pistons apart.

2. Apparatus as claimed in claim 1, wherein said displaceable means comprises a longitudinally displaceable and rotatable elongated member and a radial member extending from said elongated member to a position between said pistons, said apparatus further comprising gear selection means coupled to said elongated member for longitudinally displacing the same.

3. Apparatus as claimed in claim 2, wherein said gear selection means comprises a double-acting piston connected to said elongated member, a cylinder housing said piston and having inlets on opposite sides of said piston for controlling the same, said apparatus further comprising electro-valves coupling said source to said inlets and a manual control for selectively actuating the latter said electro-valves for the selective position of said elongated member.

4. Apparatus as claimed in claim 3, comprising a spring member engaging said elongated member and urging the same into a determinable position.

5. Apparatus as claimed in claim 4, wherein said elongated member comprises a plurality of longitudinally spaced engaging members, said apparatus further comprising engageable members spaced in substantial correspondence with said engaging members, one of said engaging members being positioned for engaging one of said engageable members with said spring urging said elongated member to said determinable position, longitudinal displacement of said elongated member selectively engaging the other of said engaging members with said engageable members.

6. Apparatus as claimed in claim 5, comprising a switch including a movable contact on said radial member and contacts selectively engageable by said movable contact with said radial member displaced, said contacts being coupled to selected of said electro-valves for the actuation thereof.

References Cited in the file of this patent
UNITED STATES PATENTS

| | | |
|---|---|---|
| 2,218,136 | Price | Oct. 15, 1940 |
| 2,234,463 | Brewer | Mar. 11, 1941 |
| 2,244,092 | Wheeler | June 3, 1941 |
| 2,795,963 | Alfieri | June 18, 1957 |